United States Patent [19]

Springer et al.

[11] Patent Number: 4,730,185

[45] Date of Patent: Mar. 8, 1988

[54] GRAPHICS DISPLAY METHOD AND APPARATUS FOR COLOR DITHERING

[75] Inventors: Richard A. Springer; Pavel Houda, both of Tualatin; Rodney B. Belshee, Tigard, all of Oreg.

[73] Assignee: Tektronix, Inc., Beaverton, Oreg.

[21] Appl. No.: 628,693

[22] Filed: Jul. 6, 1984

[51] Int. Cl.$^4$ .............................................. G09G 1/28
[52] U.S. Cl. .................................. 340/701; 340/703; 358/78; 358/283
[58] Field of Search ....................... 340/701, 703, 744; 358/283, 78

[56] References Cited

U.S. PATENT DOCUMENTS

| | | |
|---|---|---|
| 3,977,007 | 8/1976 | Berry et al. |
| 4,225,861 | 9/1980 | Langdon, Jr. et al. ............. 340/701 |
| 4,345,313 | 8/1982 | Knox .................................. 358/283 |
| 4,463,374 | 7/1984 | Thompson ........................... 358/78 |
| 4,495,522 | 1/1985 | Matsunawa et al. ................ 358/283 |
| 4,532,503 | 7/1985 | Pennebaker ........................ 340/728 |
| 4,553,172 | 11/1985 | Yamada et al. ..................... 358/283 |

FOREIGN PATENT DOCUMENTS 0005034 10/1979 European Pat. Off. .

OTHER PUBLICATIONS

Recurrent Pattern Generator, by W. C. Yu, *IBM Technical Disclosure Bulletin*, vol. 22, No. 10, Mar. 1980.

P. Stucki, "Picture Processing Using a General Purpose Computer System", IEE Conference on Displays, Sep. 7–10, 1971, London, England.

Stuart Cox et al., "Color Graphic Printers Slip Into Computer Systems", *Electronic Design*, vol. 30, (1982) Oct., No. 22.

*Primary Examiner*—Gerald L. Brigance
*Assistant Examiner*—Jeffery A. Brier
*Attorney, Agent, or Firm*—John P. Dellett; Robert S. Hulse

[57] ABSTRACT

Color dither patterns are read into a pixel bit map memory used to form a color display by means of concurrently addressing a pattern memory storing the dither patterns. Lower order address bits repeatedly access a preselected portion of the pattern memory to supply the dither pattern which is written as data into the pixel bit map memory.

12 Claims, 6 Drawing Figures

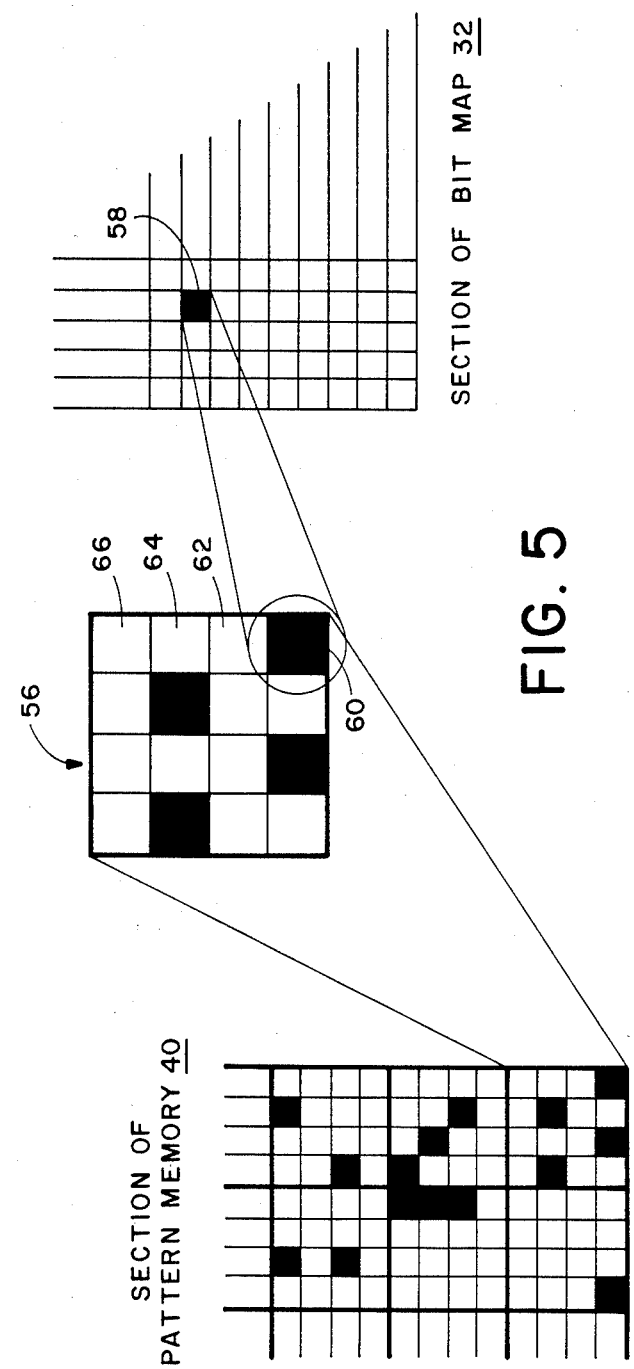

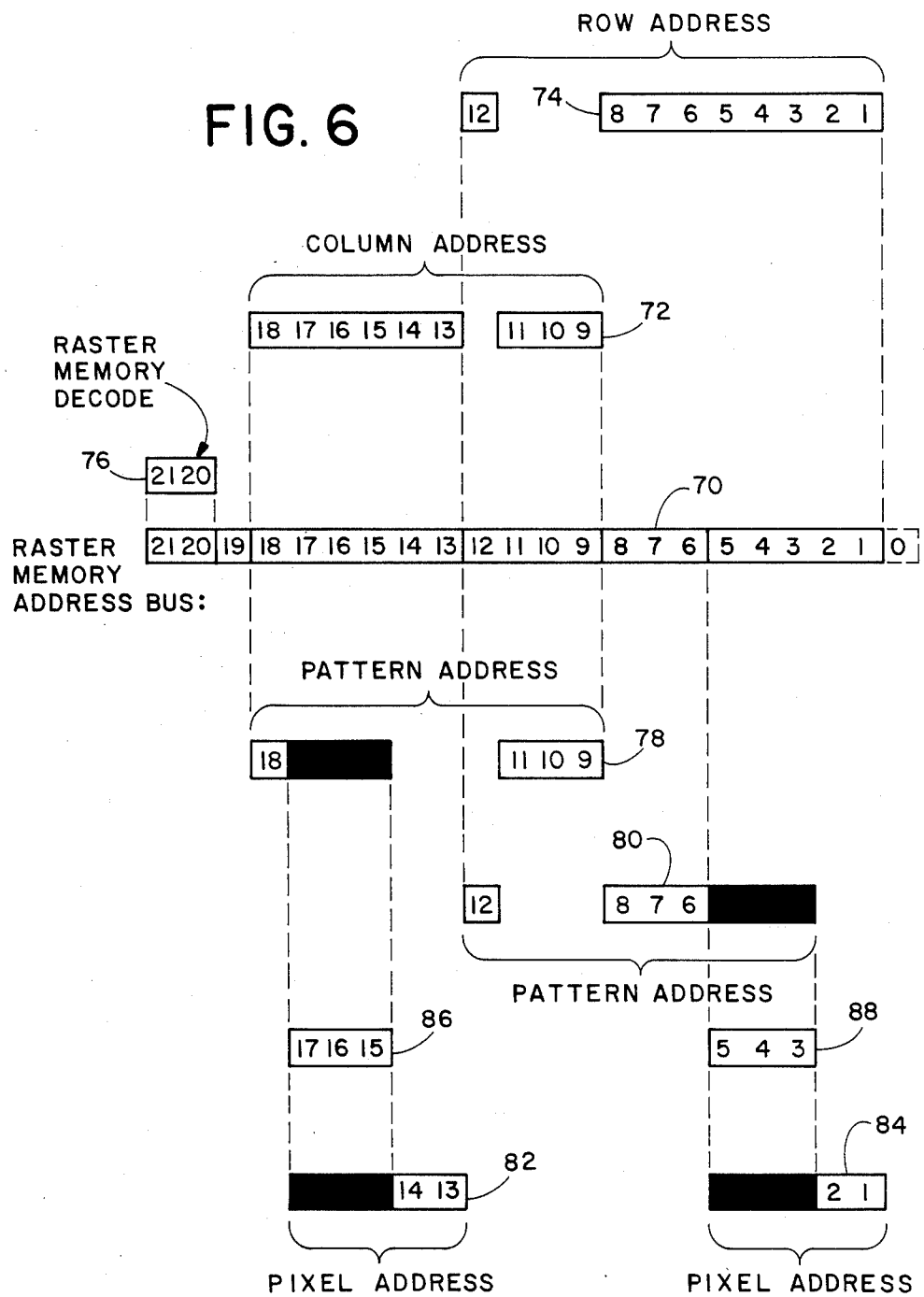

GRAPHICS DISPLAY METHOD AND APPARATUS FOR COLOR DITHERING

BACKGROUND OF THE INVENTION

The present invention relates to a graphics display method and apparatus and particularly to a method and apparatus for providing a wide range of color reproduction in minimum operating time.

Graphics display terminals and the like are not limited to the presentation of multicolor cathode-ray-tube images, but can also produce multicolor hard copy utilizing apparatus such as an ink jet copier. The ink jet copier or printer has a limited number of ink jets which can be employed separately for depositing a single bit or pixel of information on paper, or which can be used together to produce a limited number combination of colors. In a particular example, four colors of ink are used: yellow, cyan, and magenta (subtractive primaries) and black. Red, green, and blue (additive primaries) are formed by superimposing two ink colors on the same dot or pixel. Thus, cyan over yellow results in green, magenta over yellow results in red, and magenta over cyan produces blue. In this manner, the four colors of ink can produce a total of seven solid colors, with the white of the paper supplying an eighth.

However, a much wider range or colors would be desired, for example to match the range of colors which a cathode-ray-tube may be able to provide. Unfortunately, ink jets and the like are for the most part only capable of being turned on or turned off, while the mixing or various colors to form a multitude of shades would require relative intensities of the primary colors.

Another method of producing the effect of relative color intensity utilizes "dither" patterns, including dots of one color interspersed with dots of another in a correct ratio to form the desired shade. For example, to achieve a mixture of two primaries such as red and yellow, dots of red may be interlaced with dots of yellow, wherein the interlaced arrangement comprises the dither pattern. If there are appreciable numbers of dots or pixels in an area being colored, and if the resulting hard copy is viewed at any distance, the eye combines the colors of the dither pattern to achieve the effect of the desired shade.

The management of the color image including the "rasterizing" of data to supply the individual dots or pixels is usually under the control of a microprocessor. According to the conventional approach, the processor would direct the production of each pixel at each particular location on a piece of paper, and the processor would look up the color information in a table in order to determine what color each pixel should be in order to write the overall dither pattern. This approach slows operation relative to the speed of operation of an ink jet copier apparatus. It would be more desirable for the processor to simply specify a color in advance for a particular area or object, and then merely address the area or object without necessitating the organization of the required dither pattern as well.

SUMMARY OF THE INVENTION

According to the present invention in a particular embodiment thereof, a processor or the like provides the addresses (e.g. x and y coordinate addresses) for the object or graphics to be written, and these addresses are used to access locations in a pixel bit map memory. This memory is later read out for providing the actual pixels or dots on a hard copy. The data written at each pixel memory location is derived from a pattern memory accessed at the same time as the pixel bit map memory, except, in the illustrated example, only the lower order bits are employed while the higher order bits in the address for the pattern memory remain constant for a particular pattern. As the input information from the processor addresses successive locations in the pixel bit map memory, e.g. for mapping an object or coloring an area, the lower order bits repeatedly cycle through a relatively small number of values. For instance, if only the two lowest order bits of the constantly changing addresses are considered, this part will cycle from zero to three repeatedly as the overall address substantially continuously changes in a given direction to "lay in" pixels in the pixel bit map memory.

The data in the pattern memory that is repeatedly addressed and written into the bit map memory is arranged to be the dither pattern, in two dimensions, which will achieve a desired color shade. Within the pattern memory a plurality of dither patterns are stored, with one dither pattern being selected by the processor through the provision of high order address bits to the pattern memory before a given object or area is input to the pixel bit map memory.

In this manner it is seen the processor itself is not required to constantly keep track of a dither pattern and decide the actual primary color for each pixel. Rather, the processor need only specify the desired shade corresponding to a dither pattern, and then the processor specifies successive address locations for the desired object or area and the dither pattern will be automatically filled in.

It is accordingly an object of the present invention to provide an improved method and apparatus for providing multishade hard copy output for a pixelated object, area, or the like.

It is another object of the present invention to provide an improved method and apparatus for rapidly supplying control inputs for ink jet printers.

The subject matter of the present invention is particularly pointed out and distinctly claimed in the concluding portion of this specification. However, both the organization and method of operation, together with further advantages and objects thereof, may best be understood by reference to the following description taken in connection with accomapnying drawings wherein like reference characters refer to like elements.

DRAWINGS

FIG. 1 is an explanatory diagram illustrating presentation of an information display by means of dots or pixels, FIG. 2 is an explanatory diagram illustrating storage of pixels in memory planes, FIG. 3 is an explanatory diagram illustrating the generation of color shades by a "dithering" process, FIG. 4 is a block diagram of a graphics display apparatus according to the present invention, FIG. 5 is an explanatory diagram illustrating the derivation and storage of pixels in a pixel bit map memory according to the present invention, and FIG. 6 is a chart illustrating memory addressing in accordance with the present invention.

DETAILED DESCRIPTION

Figure 1:
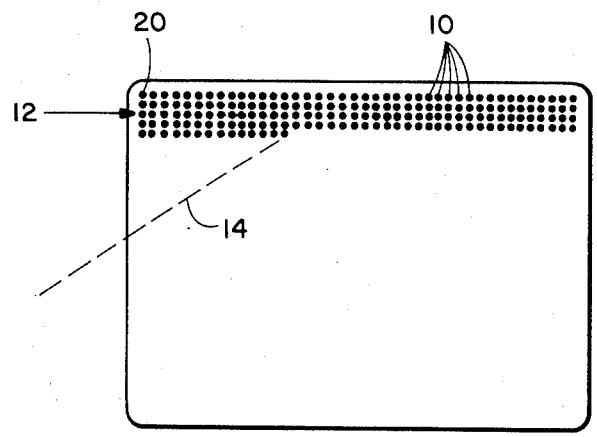

Referring to the drawings and particularly to FIG. 1, a graphics display, whether on a cathode-ray-tube or a hard copy printer, may be considered as divided into a multiplicity of dots or "pixels" 10 which are presented in a plurality of rows or scans such as row 12 in FIG. 1. The number of pixels in each row is actually much greater than illustrated, and the rows, and pixels in a row, are much closer spaced so the eye of the observer cannot distinguish between one pixel and the next at any distance. The rows of pixels are provided in sequence with each pixel being "painted" individually by an electron beam in the case of a cathode-ray-tube, or by a stream of ink, either of which is illustrated by line 14 in FIG. 1. The ink jet suitably employed for a hard copy device actually comprises four ink jet elements, one for each of the subtractive primaries, as hereinbefore mentioned, and black.

Figure 2:
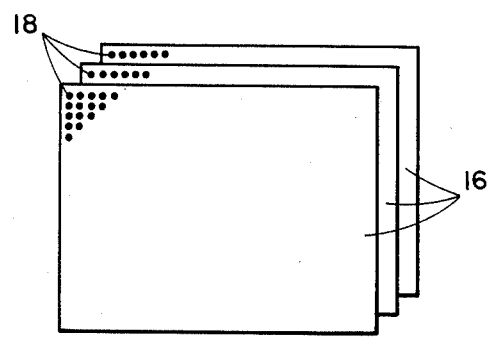

The information for providing the FIG. 1 display is derived in a conventional manner from a pixel bit map memory as schematically illustrated in FIG. 2. This pixel bit map memory comprises a number of memory "planes" 16, elements of which store digits of words identifying the pixels. Assuming a one-to-one correspondence between the memory organization and the display provided therefrom, the upper left hand bits 18 in the memory planes 16 will identify the upper left hand pixel 20 in the display in FIG. 1, and so on. The three binary bits (one for each plane) are capable of identifying eight colors, e.g. black, white, the subtractive primaries yellow, cyan and magenta, and the additive primaries red, green and blue. The information from the memory is scanned by rows, and the read out of this information controls the ink jets or the like in order to form the display image. Thus, if the image is a line drawing or an object having an area, the region of display surrounding the lines or object will be read out as white pixels (absence of information), while the line or object itself will be mapped in the memory in FIG. 2 with the individual pixel identifying a word specifying the color that is to be written at the corresponding point in the display of FIG. 1.

Figure 3:
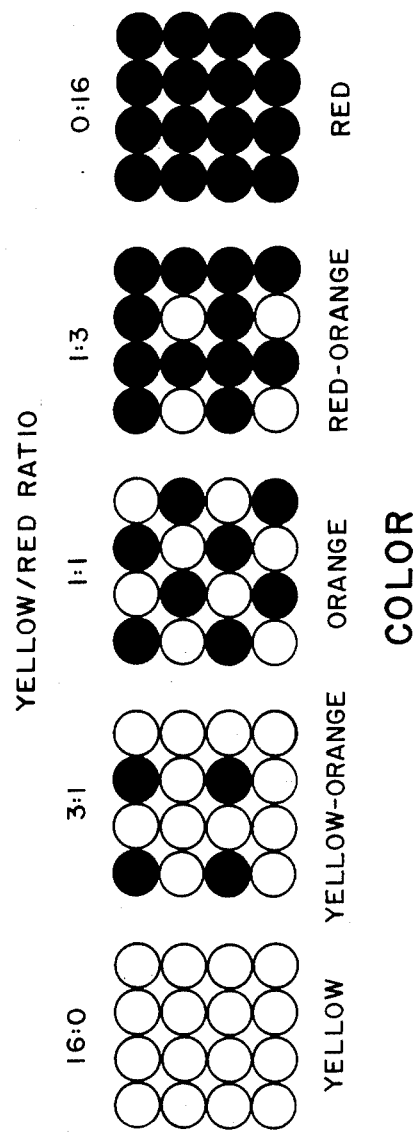

As hereinbefore mentioned, the ink jets or the like are off-on devices and are only capable of producing a limited number of colors (eight in this example), and cannot produce shades of different colors. Therefore, a process know as "dithering" is utilized wherein adjacent pixels in a particular area, instead of having the same color, are instead "painted" in different colors so that to the observer a combination of the colors is perceived. Of course, the pixels are so close together that without very close examination the individual pixels are not detectable. Referring to FIG. 3, five dither patterns are illustrated each employing a 4×4 pixel matrix. In this illustration the white dots stand for yellow pixels and the filled in dots stand for red pixels. The ratio of yellow dots to red dots in the pattern determines whether the mixture will appear as yellow (ratio of sixteen yellow dots to zero red dots), yellow-orange (ratio of three to one), orange (one to one), red-orange (one to three) or red (zero to sixteen). The dither patterns can be used to achieve similar ratio mixtures of any of the additive-subtractive primary pairs. It is seen the color shade is determined by the ratio of the number of pixels of one color imprinted to the ratio of the number of pixels of other color imprinted.

As hereinbefore mentioned, the conventional approach to pixelating an area of the display would be for the processor to look up the different colors necessary to produce a different shade and the ratio the pixels for writing the pixels of an image in dither pattern fashion.

The present invention utilizes a pattern memory which is accessed by the processor concurrently with the pixel bit map memory, the pattern from the pattern memory being read over and over again into the pixel bit map memory to provide the desired dither pattern. In this manner the processor need only specify the addresses of the object or area to be written into the pixel bit map memory and the desired dither pattern, theretofore selected by the processor, is automatically read into the pixel bit map memory as the data at the addressed pixel locations.

Figure 4:
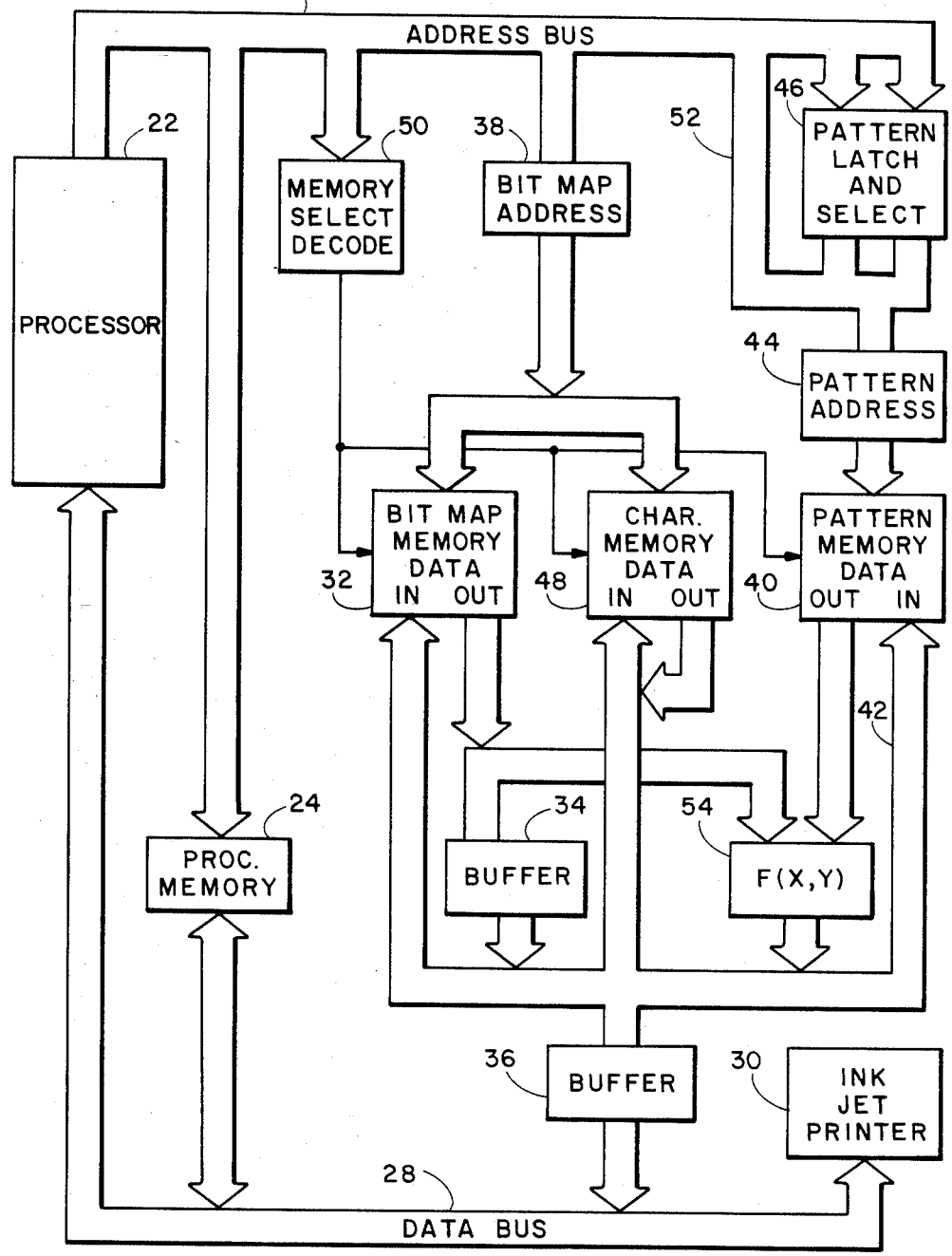

Referring more particularly to FIG. 4, processor 22 which suitably comprises a type 68000 microprocessor is connected to its main memory 24 by way of address bus 26 and data bus 28. The same address and data buses are connected to the raster memory portion, as hereinafter more fully described, and the ink jet printer apparatus 30. Appropriate buffer means or conventional I/O means, not shown, may be interposed between these various elements.

The raster memory portion mainly comprises a pixel bit map memory 32 wherein the individual pixels of a pixel map are stored in the manner schematically illustrated in FIG. 2. The pixel bit map memory 32 is read out, seriatim, via buffers 34 and 36 to the data bus for transmission, one horizontal line at a time, to ink jet printer 30 which thereupon imprints the pixel dots of the directed color in a manner understood by those skilled in the art.

The information for printing is first read into the pixel bit map memory 32, with the addresses being supplied by processor 22 through address bus 26 and bit map address circuit 38 wherein the processor addresses are converted to correct x and y addresses for accessing the bit map memory. In accordance with the present invention, the data which is to be stored in bit map memory 32 at the prescribed pixel locations is obtained from pattern memory 40, the pattern memory 40 storing a plurality of selectable dither patterns as hereinafter more fully described. These dither patterns are written in advance into pattern memory 40 from data bus 28 via raster memory data bus 42.

Pattern memory 40 is addressed from the address bus 26 by way of pattern address circuit 44 which converts the bus address to appropriate x and y addresses for the pattern memory. When pattern memory 40 is addressed for read out, only changes in the lower order bits from the address bus reach memory 40 so that a repeated dither pattern can be written therefrom into pixel bit map memory 32. These lower order bits are provided via bus portion 52. The higher order address bits for the pattern memory are held constant at this time in latch 46 and identify the particular dither pattern selected.

In addition, the circuit includes a character memory 48 which is addressed from the processor by way of address circuit 38. The processor can scan a character stored in character memory 48, e.g. over a 5×7 matrix, and where a "one" is encountered, an element of a selected dither pattern is written into memory 32.

Part of the address bits from address bus 26, e.g. the highest order bits, are provided to memory select decode circuit 50 which accordingly selects one of the memories 32, 40 or 48 for addressing.

The manner of employing pattern memory 40 for supplying dither patterns to bit map memory 32 will be further explained with the aid of FIG. 5. Considering the configuration of the pattern memory 40 illustrated at the lower left hand corner of FIG. 5, a plurality of dither patterns, each comprising a 4×4 matrix of pixels, are stored in adjoining locations in the pattern memory. For ease of explanation, the separate dither patterns are separated by heavier lines, with six such dither patterns being shown in this particular case. These dither patterns will have been previously stored in pattern memory 40 to provide the desired selection of different shades. Some dither patterns may be all one color so as to identify one of the primaries as hereinbefore described.

Let us assume the dither pattern at the lower right hand corner of the pattern memory 40 illustration has been selected by the processor. Accordingly, bits identifying this particular pattern will be stored by the processor in the latch 46, such bits comprising the higher order address bits used to address pattern memory 40 in FIG. 4.

The 4×4 pixel pattern selected is again illustrated at 56 in FIG. 5. This selected dither pattern will be repeatedly "laid in" to bit map memory 32 according to the addresses received from address bus 26. In each instance, an address from address bus 26 simultaneously addresses a pixel location 58 in pixel bit map memory 32, and a pixel location 60 in portion 56 of pattern memory 40. In response to this concurrent access, the data word representing a particular color from pattern memory 40 at location 60 will be read out of pattern memory 40 and onto raster memory data bus 42 via "merge" circuit 54. The data or word read from location 60 in pattern memory 40 is read into the bit map memory 32 at location 58.

Let us assume the processor is laying a vertical line into bit map memory 32 by means of a series of addresses identifying pixels "vertically" above one another in the pixel bit map. Then, the pixel data 60 from the pattern memory will first be written into pixel bit map memory 32 followed by pixel data 62, 64 and 66 in that order. If the processor continues to lay in a vertical line, the pixel from location 60 will again be accessed followed again by pixels at locations 62, 64 and 66 and so on. The repeated pattern will "draw" a vertical line in the bit map memory with every fourth pixel having one color while the three intervening pixels are of the other color, consequently "dithering" the line to provide a combination of the two colors.

The processor is called upon to do nothing but identify the pixel dither pattern initially by storing higher order bits of a memory address in latch circuit 46, and then specifying the successive addresses for the object or line to be drawn into the bit map memory 32. This enables the system to operate much more rapidly than if the processor had to define the color of each individual pixel.

The pattern memory 40 is read out onto raster memory data bus 42 for reading into bit map memory 32 by way of merge circuit 54, designated "f(x,y)" where x and y are the outputs of the pattern memory 40 and the previous information read from the same bit map memory location in bit map memory 32. In many cases the "f(x,y)" merely replaces y with x, that is the data from the pattern memory 40 is simply read into bit map memory 32 and previous data at the same location in bit map memory is ignored. However, the data can be combined or merged as desired. Merge circuit 54 suitably comprises a read only memory or other memory set up so that a particular combination of data words provide x and y addresses which select a "combined" color. Thus, a particular shade theretofore contained in bit map memory 32 can be overwritten by another color which can be combined therewith to change the shade.

FIG. 6 is illustrative of the addressing of the pattern memory and bit map memory for bringing about the entry of data from the pattern memory into the bit map memory. The address bus bits are illustrated at 70 in FIG. 6 with the corresponding bits for the column address and the row address of the bit map memory being shown at 72 and 74 thereabove. Bits 20 and 21 are used for memory decode and are applied to the decode circuit 50 in FIG. 4.

Further in FIG. 6, the pattern address (first axis) is illustrated at 78 and may comprise bits 9, 10, 11, 15, 16, 17 and 18. The pattern address (second axis) may comprise bits 3 through 8 and 12. The pattern addresses select the particular pattern e.g. the particular 4×4 pattern matrix, representing a particular dither pattern, from a multiplicity of such patterns stored in the pattern memory 40. For instance, the pattern addresses select one of the six dither patterns indicated between the heavier lines at the left hand side of FIG. 5. Of course, a much larger number of patterns are stored and selectable by these pattern addresses. The pattern addresses are initially stored in pattern latch and select circuit 46 by the processor before the processor writes a particular object or area into the bit map memory. Illustrated at 82 and 84 are the pixel addresses, first axis and second axis, that are used to address particular pixels within the already selected pattern matrix. These bits correspond to similarly numbered bit in the column address and the row address utilized for addressing the bit map memory, i.e. comprising the lower order bits thereof which are coupled via bus portion 52 in FIG. 4. These lower order bits combine with the pattern address bits stored in latch 46 to provide the overall addressing input to pattern memory 40.

Bits 15–17, indicated at 86 in FIG. 6, and bits 3–5 indicated at 88 in FIG. 6, may be utilized in a given instance as either part of the pattern address or as a part of the pixel address. Although the pixel patterns stored in the pattern memory have hereinbefore been described as 4×4 bit matrices, it is also possible to utilize a dither pattern matrix which is 8×8 or some larger size, therefore requiring more bits in the pixel address for the identification of each component. In such case, pattern latch and select circuit 46 stores a smaller number of bits to identify one of a smaller number of patterns, each of which includes more pixel bits and therefore requires a larger pixel address. It is readily apparent that the division of bits between pattern addresses and addresses for bits within the patterns is easily adjustable in accordance with the size of the patterns desired.

While a preferred embodiment of the present invention has been shown and described, it will be apparent to those skill in the art that many changes and modifications may be made without departing from the invention in its broader aspects. The appended claims are therefore intended to cover all such changes and modifications as fall within the true spirit and scope of the invention.

We claim:

1. A graphics display apparatus including means for portraying pixels of a display on a viewable surface, and bit map memory means for storing configurations of said pixels for display, said graphics display apparatus further comprising:

means for addressing locations in said bit map memory means in accordance with a configuration the display of which is desired, pattern memory means also responsive to said means for addressing, said pattern memory means storing plural repeatable patterns each descriptive only of color comprising a plurality of pixels substantially smaller than a display, and means for coupling pixel information data from said pattern memory means to said bit map memory means at corresponding addresses.

2. The method of operating a diaplay apparatus for portraying viewable information in the form of display elements, said apparatus including a map memory for temporarily storing a map of said elements, said method comprising the steps of:

receiving addresses of elements of a display and applying said addresses to said map memory for accessing memory locations in said map memory for the purpose of temporarily storing information at the addressed locations, while employing a portion of each of said addresses for also selectively addressing pattern element data, said pattern element data comprising plural repeatable patterns each descriptive only of color comprising a plurality of pixels substantially smaller than a display, and storing said pattern element data at the corresponding addressed locations of said map memory, said pattern element data being repeatedly accessible by groups of the addresses used to access said map memory.

3. The method according to claim 2 wherein the lower order bits of said addresses are employed to access pattern element data whereby the pattern element data provided is repeatable according to access by groups of said addresses.

4. The method according to claim 3 wherein said pattern element data comprises a matrix of color identifying color definitions for adjacent words for the purpose of providing a display having an apparent combined color.

5. The method according to claim 2 wherein said pattern element data comprises a color dither pattern characterized by element color definitions of different colors for adjacent elements over a limited range of addresses which are repeatably accessible by the addressed applied to said map memory.

6. A graphics display apparatus including means for portraying viewable information in the form of display elements, and map memory means for storing a map of said elements, said graphics display apparatus further comprising:

means for receiving addresses of elements of a display, means for coupling said addresses in access relation to said map memory means for the purpose of identifying locations in said map memory means at which elements of a display are to be written, pattern memory means for storing color identifying data adapted for entry into said map memory means, said data comprising color dither patterns, and means for coupling at least portions of the same addresses for accessing said pattern means and for writing the accessed data from said pattern memory means at the corresponding locations in said map memory means.

7. The apparatus according to claim 6 wherein said color dither patterns comprise a matrix of color identifying data words characterized by different color definitions for adjacent words, the lower order bits of said addresses being used to access data from said pattern memory means.

8. The apparatus according to claim 7 wherein said pattern memory means stores a plurality of said color dither patterns seperately selectable by higher order bits applied only to said pattern memory means.

9. The apparatus according to claim 6 including means for combining new data written into said map memory means with data theretofore written into said map memory means.

10. The apparatus according to claim 9 including means for combining new data with previously stored data before reentry into said map memory means.

11. The apparatus according to claim 6 further comprising character generator means for selectively enabling addressing to said map memory means and said pattern memory means for the purpose of writing characters in selected colors.

12. The apparatus according to claim 8 wherein a variable number of color dither patterns is storable in said pattern memory, with the number of bits of said addresses employed to select said dither patterns and the number of bits of said addresses employed to access data from said pattern memory means being correspondingly variable.

* * * * *